March 4, 1952 J. BROWN ET AL 2,588,082

ELECTRONIC CIRCUIT CHASSIS

Filed Dec. 27, 1948 2 SHEETS--SHEET 1

Inventors

John Brown, Benjamin L. Snavely and John V. Atanasoff

By Cushman, Darby & Cushman

ATTORNEYS

Inventors
John Brown, Benjamin L. Snavely
and John V. Atanasoff
By Cushman, Darby & Cushman
ATTORNEYS Patented Mar. 4, 1952

2,588,082

UNITED STATES PATENT OFFICE 2,588,082

ELECTRONIC CIRCUIT CHASSIS

John Brown, Berwyn, Benjamin L. Snavely, Takoma Park, and John V. Atanasoff, Fulton, Md.

Application December 27, 1948, Serial No. 67,324

18 Claims. (Cl. 175—298)

This invention relates to electronic circuit chassis and, in particular, it is concerned with the type of chassis which is used in forming experimental or temporary radio or other electronic circuits.

It is the common procedure in forming new types of electronic circuits to first plan the construction of the new circuits upon paper and then build an experimental model of the planned unit in order to verify the operability of the proposed circuit. For work of this character, a chassis or base is needed for mounting the various circuit components. These experimental chassis should be of such nature as to permit rapid assembly and rearrangement of the circuit elements and allow for easy testing of the circuits. Such experimental units are commonly referred to as "bread boards." In the past, they have varied from a simple wooden board to fairly elaborate pressed metal units.

Various improvements have been made from time to time in the past upon these experimental chassis, such as mounting vacuum tube sockets, so that the tubes, when inserted, assume an inverted position with connections to the tube sockets being easily accessible from above. In addition, vertical panels have been added to permit rheostats, switches, jacks, or other similar components to be mounted through holes in the panel. However, even with these added improvements, the experimental chassis known heretofore have been defective because they have not permitted various components to be positioned and soldered as easily as desired, thus requiring considerable time to be consumed for assembling or rearranging the circuits. Further, their general structure has been such as to require the use of undesirably long leads and to inhibit the free use of test equipment.

A principal object of the present invention is the provision of new forms of chassis for use in assembling experimental electronic circuits.

Further objects include:

(1) The provision of improvements in prior known forms of experimental electronic circuit chassis which help to reduce the amount of time required to assemble a circuit;

(2) The provision of such chassis which permit circuit components to be connected with minimum length leads;

(3) The provision of such units in which electronic tubes are held in an inverted position in such a manner that they may be inserted or withdrawn from their sockets without lifting or moving the chassis from a supporting experimental bench or other work table and also in such manner that the tubes are out of the way of the underneath portion of the chassis, permitting large circuit components, such as transformers or batteries, to be mounted upon the bottom portion of the chassis;

(4) The provision of such chassis which have bus bars to which leads from separate circuit elements, that are to be connected together, may be soldered without requiring the leads to be wrapped about the bars, or without loss of solder by dropping or flowing from the bar;

(5) The provision of such chassis wherein leads to be joined to a common potential may be connected through an individual, readily detachable socket and plug arrangement;

(6) The provision of novel means for fixing bus bar assemblies to such chassis.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by forming a circuit element mounting plate with an up-turned side portion so as to provide the plate with an inclined side wall for carrying electronic tube sockets in an inverted position, supporting this plate by a suitable supporting means in an elevated, horizontal position, and mounting an assembly of bus bars just above the top of the mounting plate. Further additional features are added to this basic arrangement so as to form chassis which are uniquely suited for experimental assembly work.

A more complete understanding of the structures of this invention, than has been given by the general statement in the above paragraph, can be had by reference to the accompanying drawings and the following description thereof. In the drawings, Figure 1 is a top perspective view of a preferred form of chassis incorporating the novel features of this invention;

Figures 1, 2:
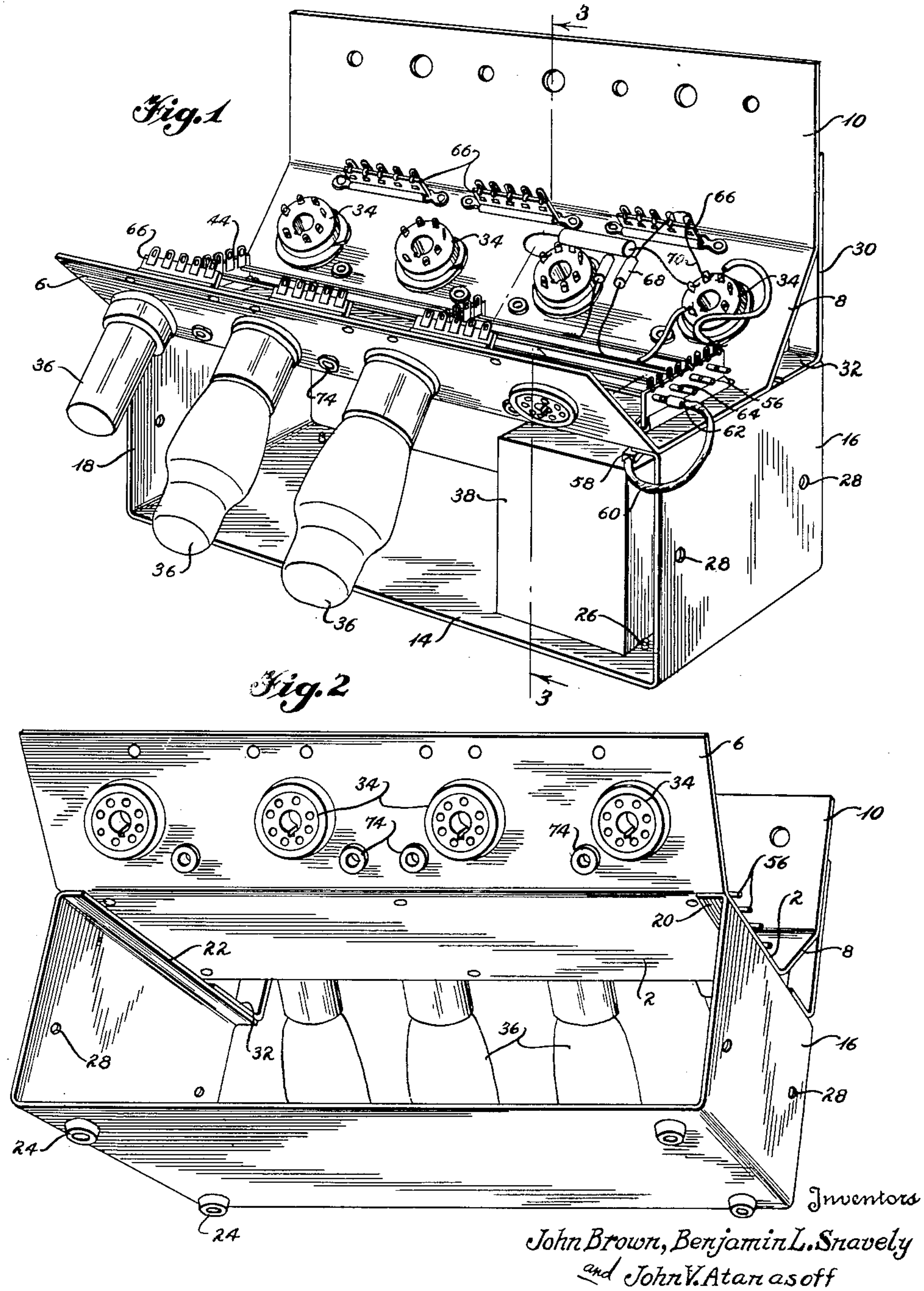
Figure 2 is a bottom perspective view of the chassis of Figure 1, with a slight rearrangement in electronic circuit components mounted upon the chassis.

Referring in detail to the drawings, the mounting plate 2 of the chassis 4 has two opposite side portions 6 and 8 turned upwardly at an acute angle creating inclined side walls along the plate 2 which form a trough-shaped structure. An extension of side portion 8 is turned up in a second acute angle forming a vertical panel 10 which runs perpendicular to the horizontal mounting plate 2. The plate may be made from a rigid material, but is best formed from a metal sheet.

The plate 2 is supported in an elevated position by the supporting structure 12 which consists of a rigid sheet, preferably of pressed metal, bent in the form of a U, having the base 14 with side members 16 and 18 located in a plurality of planes. The upper edges of said members 16 and 18 are bent over to form flanges 20 and 22 to which the bottom side of the plate 2 is fastened, such as by rivets or welds. Such supporting structure is adapted to engage a work table or the like and to support the plate 2 elevated above and against tilting movement relative to such a work table and with the side plate inclined thereto.

Preferably, the supporting base 12 is provided with rubber pads 24 fastened to the base 14 by means of screws 26. Furthermore, the side members 16 and 18 have holes 28 drilled therethrough, so that two or more chassis can be connected together, if this is required to provide sufficient space for mounting the circuit elements.

In order to further strengthen the unit and stiffen the panel 10, angle pieces 30 are attached, such as by welding, to the face of the panel with the lower ends 32 of the angle pieces being fastened to the respective flanges 20 and 22.

The inclined side walls 6 and 8 carry vacuum tube sockets 34 in an inverted position so that the tubes 36 required in a circuit can be inserted in the sockets from the underneath side of the mounting plate 2, as is shown in Figures 1 and 2 of the drawing. This arrangement of the tube sockets in inverted position on the inclined side walls makes the vacuum tubes 36 extend downwardly at an angle which enables the tubes to be withdrawn from sockets without having to lift the chassis. In addition, it allows all of the free space beneath the plate 2 and above the base 14 to be used for mounting or carrying various large circuit elements, such as transformers, batteries, coils, or the like, which cannot be readily mounted above the plate 2. This arrangement is illustrated in Figure 1, where the battery 38 is shown supported upon the base 14 beneath the plate 2.

The inclination of the side portions 6 and 8 of the plate 2 also makes possible an additional novel feature of these new chassis. Thus, this side wall slope at an acute angle reduces the length of leads which are required to connect components mounted upon the side walls, such as the tube base 34 to the components mounted upon the plate 2, such as the bus bars 40.

The bus bars 40 can be of any general variety, but are preferably of the type shown and described in copending application of Benjamin L. Snavely and John U. Atanasoff, Serial No. 67,323, filed of even date herewith on "Bus Bars and Bus Bar Assemblies." Such bus bars have a groove 42 in their outer surface which is filled with solder. The bars 40 are all mounted parallel to one another with the recess or groove 42 of each bar extending upwardly and with the ends of the bars, which are preferably all of the same length, aligned.

The mounting of the bus bars can be accomplished by any holding means which insulates one bar from another and holds them in the preferred relationship, i. e., parallel to one another and slightly elevated above the mounting plate 2. However, the holding means are preferably insulated terminal strips 44, provided with terminal lugs 46 with the bars 40 passing through holes 47 in the strips 44. The holes 47 can be of such size as to require a press fit of the bars 40 and thus prevent the bars from turning or, more preferably, the tolerances between the bars and the holes may be less critical and the bars may be held by soldering the end bars to the individual terminal lugs 46, as is shown in Figure 3.

This latter arrangement also electrically connects individual bus bars to separate terminal lugs, permitting the bars to be easily connected by a solder joint through the lugs 46.

Figures 3, 4, 8:
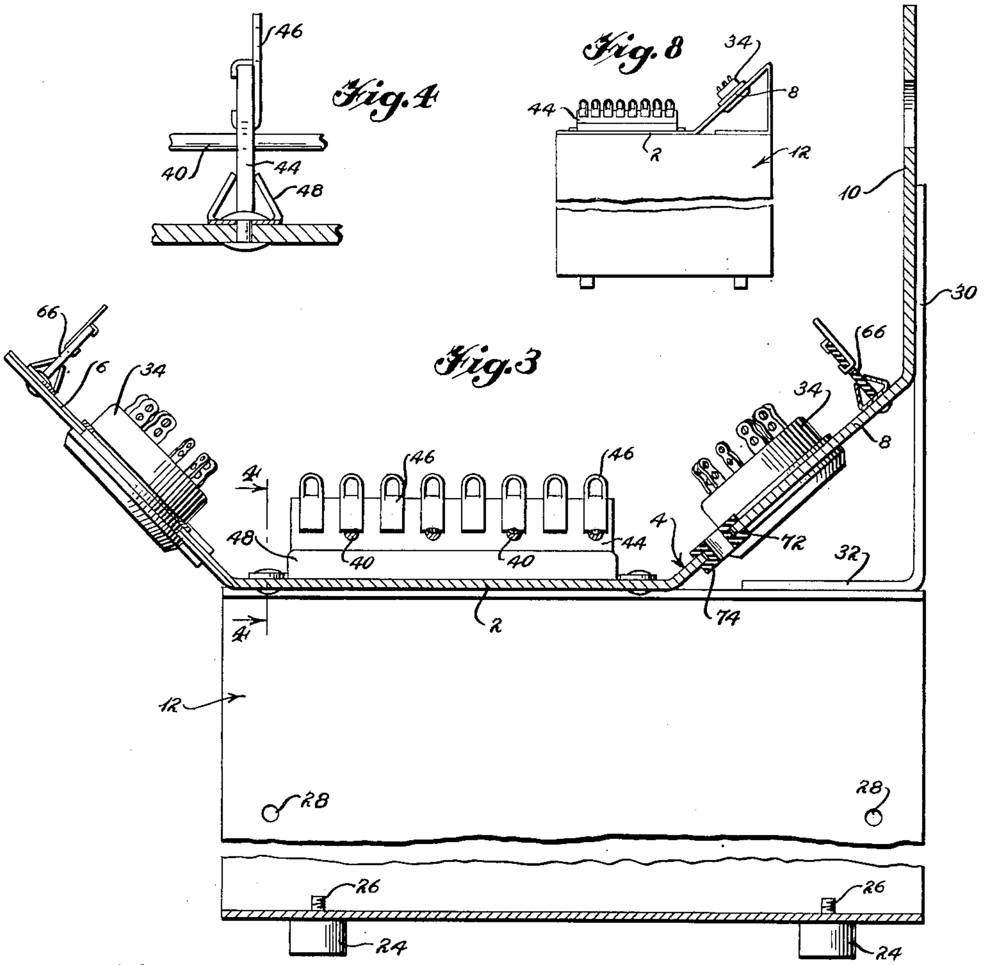
Figure 3 is a sectional view of the chassis of Figure 1, taken along the line 3—3 of Figure 1.
Figure 4 is a sectional view taken along line 4—4 of Figure 3, showing the details of the mounting strips for holding the bus bars upon the mounting plates of the chassis.
Figure 8 is a diagrammatic side view of a modified form of the chassis.
Figure 5:
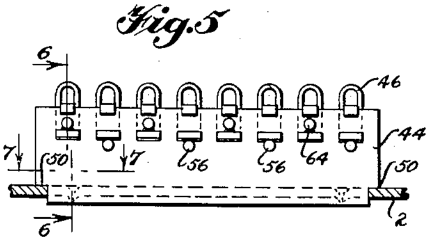
Figure 5 is an end view partly in section of a modified form of insulating mounting strip for the bus bars.
Figure 7:
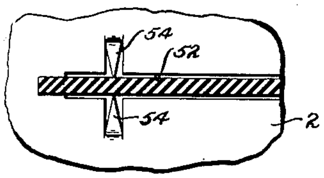
Figure 7 is a sectional view taken along the line 7—7 of Figure 5, showing the details of method of mounting the insulating strips upon the chassis mounting plate.
Figure 6:
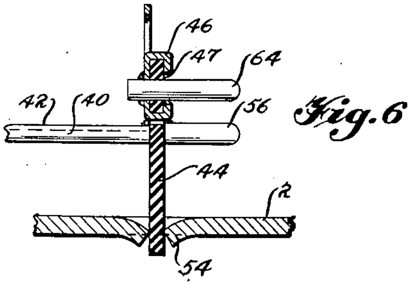
Figure 6 is a sectional, detailed view of the bus bar mounting strips taken along the line 6—6 of Figure 5.

The terminal strips 44 may be fastened to the plate 2 by means of metal strips 48 which are riveted or screwed to the plate 2 and crimped at their sides to the insulated strip 44, as is shown in Figure 4. However, the preferred form of attaching the strips to the mounting plate is illustrated in Figures 5 to 7. In this arrangement, the opposite corners of the edge of the strip 44 are notched out, forming shoulders 50. This lower edge of the strip 44 is then inserted through a slot 52 cut in the plate 2 and the strip is retained within this slot by means of tongues 54, which are forced against the side of the strips 44 when they are inserted in the strip in the slot. The strip shoulders 50 determine the distance that the strips may be pushed into slots 52 and, thus, fix the spacing between the bus bars and the plate 2.

The recesses 42 in the bus bars 40 are preferably terminated short of the ends 56 of the bars and the bar ends 56 are shaped in the form of plugs which can be inserted into mating detachable sockets.

The plug ends 56 on the bars 40 allow the bars to be readily connected or disconnected from other elements in the circuit or to external circuits or power sources through detachable sockets and leads. The connection of an element to the end of the bus bar in this fashion is illustrated in Figure 1, wherein the battery 38 has its binding post 58 connected by the detachable lead 60 through the detachable socket 62 to the plug end of one of the bus bars. In a similar fashion, any other one of the bars can be electrically united with any other circuit component or to any outside source of energy or to test equipment.

In order to increase the adaptability of the chassis, the terminal strips 44 also have several terminal lugs with attached plug ends 64 which are not extensions of bus bars. With this arrangement, easy connection can be made through the plug 64 to any circuit element which has a lead soldered to the corresponding terminal lug. Additional flexibility of the structure is afforded by the terminal strips 66 which are fastened to the upper edges of the inclined side walls. As shown in Figure 1, these terminal strips permit such circuit elements as resistors 68 or leads 70 to be connected by a quick and simple soldering operation and, yet to be held in rigid position providing static free operation of the experimental circuit.

In order to permit lead wires to be run from the upper part to the lower part of the chassis without extending over the edges, holes 72 are drilled in the side portions 6 and 8. These holes are preferably fitted with insulating grommets 74.

In those cases where smaller numbers of circuit elements are required to be mounted upon the chassis than can be handled by the preferred form shown in Figures 1 and 3, it is possible to employ a modified form of chassis, such as that shown in Figure 8. In this form of chassis, the inclined side wall 6 and the panel 10 are completely eliminated from the unit, so that the mounting base consists only of the plate 2 and the inclined side wall 8 which carries the bus bars, tube bases, terminal strips and the like, just as those forms shown in Figures 1 to 3. If desired, just the side wall 6 can be eliminated, leaving the member 8 and panel 10.

The new forms of electronic circuit chassis, as described above, permit experimental circuits to be assembled or rearranged in a minimum amount of time. At the same time, they make possible the rapid connection and disconnection of circuit elements, such as condensers or resistors, without destroying the elements or their leads. Furthermore, these new chassis provide for rapid connection to external circuits through readily detachable plug and socket arrangements. All these features combine to permit the engineer or technician to experiment and design circuits with the greatest possible ease and shortest possible expenditure of time for mechanical connection of circuit elements.

We claim:

1. A chassis for use in assembling experimental electronic circuits which comprises a mounting plate having an upper surface for supporting electrical conductors, a side plate extending upwardly from the mounting plate in obtuse angular relation therewith, a supporting structure including members located in a plurality of planes, said members extending downwardly from the mounting plate and adapted to engage a work table and support said plate elevated above and against tilting movement relative to such a work table and with the side plate inclined thereto, and electronic tube sockets mounted on the outer side of the side plate and with their wiring terminals located inwardly of the side plate.

2. A chassis as claimed in claim 1 including a plurality of parallel bus bars mounted on said plate above the upper surface thereof.

3. A chassis as claimed in claim 2, wherein said supporting means comprises a rigid channel member having the two side portions thereof fixed to the bottom of said plate member.

4. A chassis as claimed in claim 3, wherein said bus bars are aligned in insulating strips fixed to said plate member.

5. A chassis for use in assembling experimental electronic circuits which comprises a mounting plate having an upper surface for supporting electrical conductors, a side plate extending upwardly from the mounting plate in obtuse angular relation therewith, a supporting structure including members located in a plurality of planes, said members extending downwardly from the mounting plate and adapted to engage a work table and support said plate elevated above and against tilting movement relative to such a work table and with the side plate inclined thereto, electronic tube sockets mounted on the outer side of the side plate and with their wiring terminals located inwardly of the side plate, and a plurality of bus bars carried above the top of the mounting plate by holding means mounted upon said plate.

6. A chassis as claimed in claim 5, wherein terminal strips are fixed along the upper edge of said side plate.

7. A chassis as claimed in claim 5 including a second side plate opposite said first named side plate and extending upwardly from the mounting plate in obtuse angular relation therewith, said side plates and mounting plate forming a trough-shaped member.

8. A chassis as claimed in claim 5 including a panel extending upwardly from said side plate and arranged substantially perpendicular to said mounting plate.

9. A chassis as claimed in claim 8, wherein said panel has holes therethrough for mounting electronic circuit components.

10. A chassis for use in assembling experimental electronic circuits which comprises a mounting plate having an upper surface for supporting electrical conductors, side plates extending upwardly from the mounting plate on opposite sides thereof and in obtuse angular relation therewith, a supporting structure including members located in a plurality of planes, said members extending downwardly from the mounting plate and adapted to engage a work table and support said plate elevated above and against tilting movement relative to such a work table and with the side plate inclined thereto, and electronic tube sockets mounted on the outer side of the side plates and with their wiring terminals located inwardly of the side plates.

11. A chassis for use in assembling experimental electronic circuits which comprises a mounting plate having an upper surface for supporting electrical conductors, a side plate extending upwardly from the mounting plate in obtuse angular relation therewith, supporting means extending downwardly from the mounting plate adapted to support said plate in elevated position and with the side plate inclined to the horizontal, electronic tube sockets mounted on the outer side of the side plate and with their wiring terminals located inwardly of the side plate, and a plurality of bus bars carried above the top of the mounting plate, said bus bars each having a longitudinal recess in their outer surface with solder in the recess, the bars being carried upon holding means fixed to said plate parallel to one another, with the solder-containing recesses all facing upwardly.

12. A chassis as claimed in claim 11, wherein said bus bars are all of equal length and the ends of the bars are all aligned.

13. A chassis as claimed in claim 12, wherein the ends of said bars are shaped in the form of connector plugs for insertion into mating, detachable sockets.

14. A chassis for use in assembling experimental electronic circuits which comprises a mounting plate having an upper surface for supporting electrical conductors, a side plate extending upwardly from the mounting plate in obtuse angular relation therewith, supporting means extending downwardly from the mounting plate adapted to support said plate in elevated position and with the side plate inclined to the horizontal, said supporting means comprising a rigid sheet bent in the form of a U with the upper ends thereof bent over forming flanges upon which said plate is fastened, electronic tube sockets mounted on the outer side of the side plate and with their wiring terminals located inwardly of the side plate, and a plurality of bus bars carried above the top of the mounting plate by holding means mounted upon said plate.

15. A chassis for use in assembling experimental electronic circuits which comprises a mounting plate having an upper surface for supporting electrical conductors, a side plate extending upwardly from the mounting plate in obtuse angular relation therewith, supporting means extending downwardly from the mounting plate adapted to support said plate in elevated position and with the side plate inclined to the horizontal, electronic tube sockets mounted on the outer side of the side plate and with their wiring terminals located inwardly of the side plate, and a plurality of bus bars carried above the top of the mounting plate, said bus bars being held above said plate by passing through holes in rectangular insulating strips, the strips having the two corners on the bottom side notched out forming shoulders, said strips being affixed to said plate by having the bottom edge thereof pass through slots in the plate with deformed tongues formed by cuts in said plate gripping the side portions of said strips and the bottom edge of said shoulders engaging the top surface of said plate.

16. A chassis as claimed in claim 15, wherein said strips are terminal strips and said bars are soldered to individual terminal lugs carried by the strips.

17. A chassis for use in assembling experimental electronic circuits which comprises a circuit element mounting plate having two opposite side portions thereof up-turned at an acute angle forming inclined side walls which define a trough-shaped member, one of said side portions being extended and bent upwardly perpendicular to the plate forming a vertical panel, circuit component mounting holes in said panel, a U-shaped rigid base member, having the upper edges turned over, forming horizontally extending flanges, said plate being fastened to said flanges whereby the plate is held in an elevated position, electronic tube sockets carried in an inverted position upon said inclined side walls with the connecting lugs of the tube sockets facing upwardly on the top side of the plate member, a plurality of bus bars of substantially equal length having recesses filled with solder in their outer surfaces mounted parallel to one another in a plane parallel to the plane of said plate with their ends aligned by means of insulating strips through which said bus bars pass.

18. A chassis as claimed in claim 17, wherein said bus bars are all held with the solder-filled recesses facing upwardly by being soldered to terminal lugs carried upon said insulating strips.

JOHN BROWN.
BENJAMIN L. SNAVELY.
JOHN V. ATANASOFF.

REFERENCES CITED

The following references are of record in the file of this patent:

UNITED STATES PATENTS

| Number | Name | Date |
|---|---|---|
| 1,667,871 | Sachs | May 1, 1928 |
| 1,769,851 | Nachumsohn | July 1, 1930 |
| 1,909,685 | Kenny | May 16, 1933 |
| 2,046,102 | Abbott | June 30, 1936 |
| 2,076,491 | Allen | Apr. 6, 1937 |
| 2,223,539 | Baker | Dec. 3, 1940 |
| 2,241,075 | Sunderehauf | May 6, 1941 |
| 2,241,181 | Bushnell | May 6, 1941 |
| 2,435,989 | Webster | Feb. 17, 1948 |
| 2,446,701 | Greene | Aug. 10, 1948 |

FOREIGN PATENTS

| Number | Country | Date |
|---|---|---|
| 161,587 | Switzerland | July 17, 1933 |
| 340,267 | Italy | May 7, 1936 |